United States Patent
Seymour et al.

(10) Patent No.: US 6,681,203 B1
(45) Date of Patent: Jan. 20, 2004

(54) COUPLED ERROR CODE PROTECTION FOR MULTI-MODE VOCODERS

(75) Inventors: James P. Seymour, Lake Hiawatha, NJ (US); Michael D. Turner, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/257,950

(22) Filed: Feb. 26, 1999

(51) Int. Cl.$^7$ ............................................. G01L 19/12
(52) U.S. Cl. ........................................................ 704/221
(58) Field of Search .................................. 704/221, 229, 704/230, 201; 714/704, 712, 714, 715, 799, 807, 797

(56) References Cited

U.S. PATENT DOCUMENTS

| | | | |
|---|---|---|---|
| 4,712,215 A | * 12/1987 | Joshi et al. | 714/776 |
| 4,720,830 A | * 1/1988 | Joshi et al. | 714/775 |
| 5,136,592 A | * 8/1992 | Weng | 708/492 |
| 5,392,300 A | * 2/1995 | Borth et al. | 714/758 |
| 5,473,727 A | * 12/1995 | Nishiguchi et al. | 704/221 |
| 5,522,009 A | * 5/1996 | Laurent | 704/221 |
| 5,666,370 A | * 9/1997 | Ganesan et al. | 371/37.01 |
| 5,703,882 A | * 12/1997 | Jung et al. | 370/474 |
| 5,734,789 A | * 3/1998 | Swaminathan et al. | 704/211 |
| 5,737,484 A | * 4/1998 | Ozawa | 704/219 |
| 5,751,725 A | * 5/1998 | Chen | 371/5.5 |
| 5,802,080 A | * 9/1998 | Westby | 714/712 |
| 5,903,862 A | * 5/1999 | Weaver, Jr. | 704/212 |
| 5,936,979 A | * 8/1999 | Jyrkka | 374/40.11 |
| 6,032,253 A | * 2/2000 | Cashman et al. | 710/105 |
| 6,092,230 A | * 7/2000 | Wood et al. | 714/755 |
| 6,094,465 A | * 7/2000 | Stein et al. | 375/346 |
| 6,108,372 A | * 8/2000 | Tidemann, Jr. et al. | 375/225 |
| 6,178,535 B1 | * 1/2001 | Kajala et al. | 714/752 |
| 6,208,699 B1 | * 3/2001 | Chen et al. | 375/340 |
| 6,233,550 B1 | * 5/2001 | Gersho et al. | 704/208 |
| 6,260,017 B1 | * 7/2001 | Das et al. | 704/265 |
| 6,480,556 B1 | * 11/2002 | Guey | 375/343 |

* cited by examiner

*Primary Examiner*—Doris H. To
*Assistant Examiner*—Michael N. Opsasnick

(57) ABSTRACT

A method of insuring the accuracy of transmitted or stored digital data involves the use of a cyclical redundancy check (CRC) code. The method is particularly useful for ensuring the accuracy of frames transmitted between multi-mode vocoders. The method allows a different CRC code to be used for each mode of a transmitting multi-mode vocoder. A receiving multi-mode vocoder checks the CRC code against the CRC coding formulas of the various modes. If the CRC code is satisfied under any one of the modes, the frame is labeled as "good". If the CRC code fails under all the modes, the frame is labeled as "bad". If the bit frame includes bits for indicating the mode of the transmitting multi-mode vocoder, the receiving multi-mode vocoder checks the CRC code against the CRC coding formula for the indicated mode only. If the CRC code passes for the indicated mode, the frame is labeled as "good", otherwise, the frame is labeled as "bad".

36 Claims, 8 Drawing Sheets

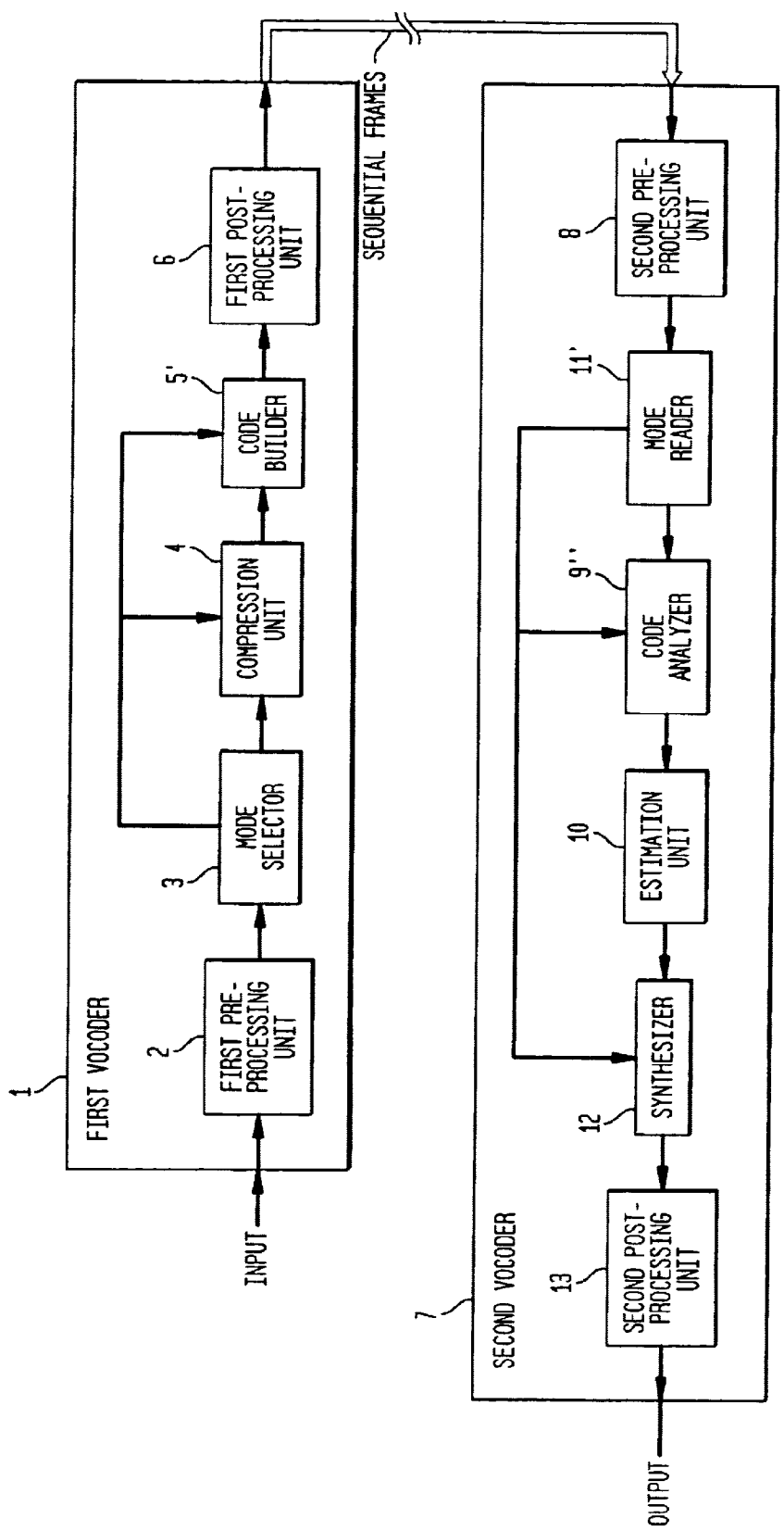

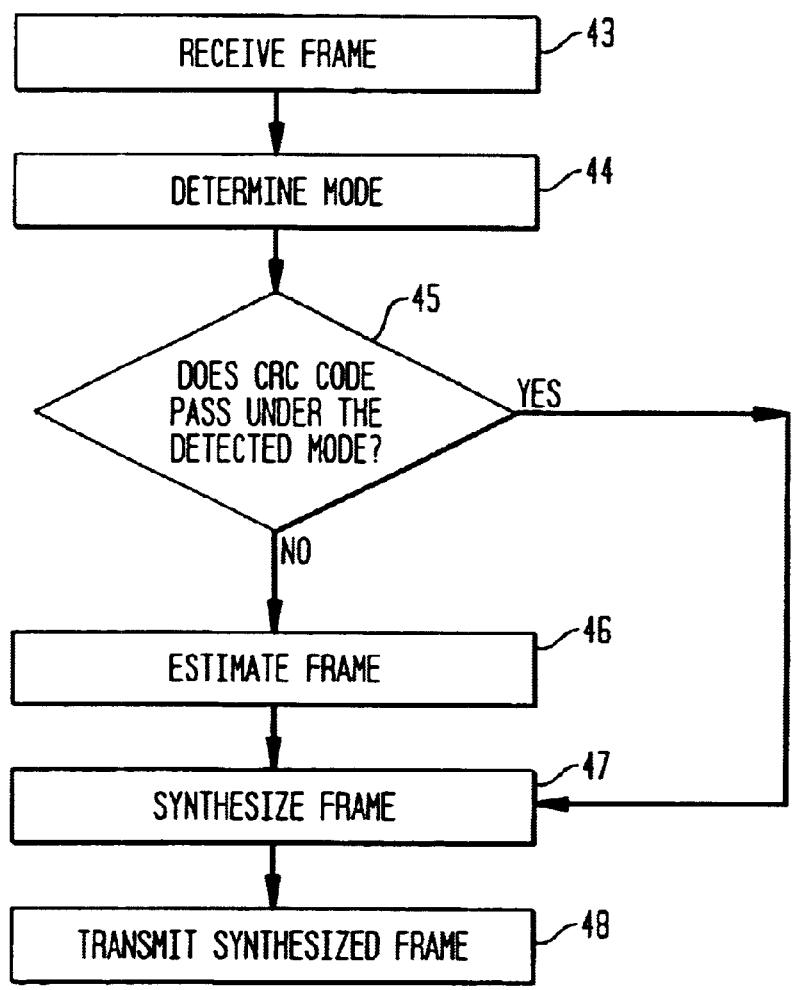

COUPLED ERROR CODE PROTECTION FOR MULTI-MODE VOCODERS

BACKGROUND OF THE INVENTION

1. Field of the Invention

The present invention relates to insuring the accuracy of transmitted or stored digital data of a multi-mode vocoder.

2. Description of the Related Art

Vocoders are known in the existing arts. Briefly, a vocoder processes a digital speech signal by sequentially breaking the digital speech signal into segments. Next, the vocoder derives various parameters relating to each segment, such as a pitch value, pitch gain, fixed codebook response, etc. The derived parameters are characterized by bit patterns, which are assembled into a frame. Each frame is representative of the original speech signal segment. The sequential frames are compressed, relative to the original segments, and therefore can be transmitted more quickly, or stored in less memory, than the original segments.

When the transmitted frames are received, or the stored frames are retrieved, another or the same vocoder must decompress the frames in order to reconstruct, or synthesize, a recognizable voice approximating the original digital speech signal. When decompressing a frame, it is important to determine if a transmission, or encoding error, has occurred. If an error goes undetected, the quality of the synthesized speech relating to the erroneous frame will be impaired. If an error is detected, the frame can be ignored, or estimated relative to preceding and/or succeeding frames, thereby improving the overall quality of the reproduced voice.

FIG. 1 illustrates first and second vocoders in accordance with the background art. The first vocoder 1 includes a first pre-processing unit 2, a mode selector 3, a compression unit 4, a code builder 5, and a first post-processing unit 6. The second vocoder 7 includes a second pre-processing unit 8, a code analyzer 9, an estimation unit 10, a mode reader 11, a synthesizer 12, and a second post-processing unit 13.

With reference to FIG. 2, the first pre-processing unit 2 receives an input signal in step 14. The first pre-processing unit 2 conditions the input signal for later processing. For example, if the input signal is an analog speech signal, the first pre-processing unit 2 would convert the analog speech signal into a digital speech signal. Also, the first pre-processing unit 2 will divide the digital speech signal into a sequential series of signal segments.

In step 15, the mode selector 3 analyzes the signal segment and determines a type of the digital speech signal contained therein. For instance, the speech signal could be a voiced type of speech signal. An example of a voiced speech signal would be a vowel sound. In characterizing a vowel sound, certain tonal parameters, like pitch delay and pitch, are relatively important. Another type of speech signal would be an unvoiced speech signal. An example of an unvoiced speech signal would be an "s" sound, or any sound resembling noise or static. In characterizing an unvoiced sound, the pitch parameters are relatively unimportant, rather parameters like a fixed codebook output are important. Of course, the mode selector 3 could determine other types of speech signals, and it is important to note that, the mode of a digitized speech signal could change one hundred times a second.

In step 16, the compression unit 4 derives characteristic parameters relating to the signal segment. The compression unit 4 includes various components, such as an adaptive codebook, fixed codebook, impulse response unit, linear predictive coder, etc. The parameters obtained by the various components relate to attributes of the signal segment, such as pitch, pitch gain, fixed codebook output etc. The compression unit 4 assigns bit patterns to characterize the derived parameters. It should be noted that steps 16 and 15 may occur in reverse order, or be interrelated. In other words, outcomes of step 16 may be the basis of the mode selection of step 15.

In step 17, the compression unit 4 assembles the bit patterns into a frame. A typical frame may consist of one hundred to two hundred bits, although it is envisioned that the frames could have any number of bits. FIG. 3 is illustrative of two sequential frames produced by the compression unit 4. The pitch is characterized by the bits residing in bit positions three through six of the frame and the pitch gain is characterized by the bits residing in positions ninety-five through ninety-nine of the frame. The non-illustrated bit positions would contain other information characterizing the speech signal segment. Of course, the positioning of the characterizing information within the frame and the number of bits allocated to each parameter can be varied.

As illustrated in FIG. 1, the compression unit 4 receives the mode from the mode selector 3. Depending upon the mode, the compression unit 4 will allocate greater importance to the parameters which best characterize the mode's respective type of speech signal. For instance, if a voiced speech signal is processed, then more bits, and hence greater resolution, will be afforded to the pitch and pitch gain parameters. The additional bits used for the pitch and pitch gain parameters may be taken from the less important parameters of a voiced speech signal, such as the random parameters. If an unvoiced speech signal is processed, then more bits may be afforded to the fixed codebook output parameter, at the expense of the pitch and pitch gain parameters.

It would also be possible for the positioning of the various parameters within the frames to vary between the different modes. For instance, in the mode corresponding to a voiced speech signal, the pitch parameter would occupy the bit positions between four and fourteen, whereas in the mode corresponding to an unvoiced speech signal, the pitch parameter would occupy the bit positions between twenty and twenty-three.

FIG. 4 illustrates four modes of the first vocoder 1. Of course, the first vocoder 1 could have more than four modes. Each mode has a plurality of important bits, labeled "B", and a plurality of unimportant bits, labeled "b". An important bit "B" means that the data in the bit position relates to an important parameter for the particular mode, e.g. type of speech. For example, the bit positions representing pitch are important bit positions in the mode representing voiced speech signals. It can be seen that both the number and position of the important bits "B" will vary between the different modes. Typically, the number of important bits in a given mode will be between forty to one hundred bits, with the remaining bits being of reduced importance in the later reconstruction of the speech signal.

Referring to FIG. 2, in step 18, the code builder 5 builds a cyclical redundancy check (CRC) code based upon the potentially important bits within the frame. The CRC code would be one or more bits added to the frame, whose purpose is to ensure the accuracy of the potentially important bits in the frame. One example of a CRC coding formula would be the repetition of each of the potentially important bits within the frame. In this instance, the CRC code would be robust, i.e. would provide a high level of assurance that no error occurred in the important bits, but would require a large number of bits. Another example of a CRC coding formula would be a simple one-bit parity check of the potentially important bits. In this instance, the CRC code would require only one bit, however the accuracy of the important bits might not be adequately insured. A good compromise would be a CRC coding formula based upon a polynomial of the potentially important bits. Such a form of CRC coding is known in the art.

As illustrated in FIG. 4, the different modes have differing numbers of actually important bits "B". Further, the locations of the important bits "B" vary between the different modes. Therefore, in order to assure that all potentially important data in a frame, regardless of the mode, is protected, the CRC coding formula is a master coding formula and protects each bit of a frame, which could potentially contain an important bit "B" in the various modes. For example, in FIG. 4, of the illustrated bits, bits 00, 01, 02, 03, 04, 06, 07, 09, 97, 98, and 99 could potentially contain an important bit "B", depending upon the mode. Of the illustrated bits, only bits 05, 08 and 10 are unimportant bits "b", regardless of the mode. Therefore, the CRC coding formula would involve bit positions 00, 01, 02, 03, 04, 06, 07, 09, 97, 98 and 99 to arrive at a CRC master code.

Referring to FIG. 2, in step 19, the first post-processing unit 6 transmits the frame, which includes the CRC code. The sequentially transmitted frames, hundreds per second, are sent via a hardwired or wireless medium to the second vocoder 7. In step 20, the second pre-processing unit 8 receives the frame. In step 21, CRC code analyzer 9 intercepts the CRC code bits of the frame. In step 22, the code analyzer 9 determines if the bits within the various potentially important bit positions of the frame, after having the master coding formula applied thereto, match the CRC code. If no match occurs, the frame is erroneous and labeled "bad", and the process goes to step 23. If a match occurs, it is assumed that no error occurs, the frame is labeled "good", and the process proceeds to step 24.

In step 23, the "bad" frame is replaced with an estimated frame by the estimation unit 10. The estimated frame will include estimations of the characterizing parameters contained in the frame. The location and resolution of the estimated characterizing parameters within the frame will be dictated by an estimation of the mode of the frame. The estimated frame could simply be identical to the previous frame (in which case the mode would be the same), or could be estimated based upon prior and/or future frames (in which case the mode of the frame could change). In any event, the estimated frame should result in the overall quality of the reproduced speech being improved, since the known erroneous frame will have been detected, removed and replaced. The estimated mode, as estimated in step 23, can be sent directly to the synthesizer 12, or encoded into the estimated frame to be read by the mode reader 11 in step 24.

In step 24, the mode reader 11 determines the mode of the frame. The synthesizer 12 receives the mode from the mode reader 11. In step 25, based upon the mode, the synthesizer 12 synthesizes, or reconstructs, the digital speech signal segment from the characterizing parameters represented by the bit patterns within the frame, albeit the original frame of step 20 or the estimated frame of step 23. In step 26, the second post-processing unit 13 sequentially outputs the synthesized digital speech signal segments.

The process, in accordance with the background art as detailed above, suffers several disadvantages. First, the master coding formula used by the code builder 5 in step 18 causes erroneous frames to be detected more often than necessary by the code analyzer 9 in step 22. This occurs because the CRC master coding formula is protecting unimportant bits in any given mode. For example, in FIG. 4's mode 04, the CRC master coding formula would incorporate bit position 07, even though bit position 07 is an unimportant bit "b". Therefore, if an error occurred in bit position 07, the CRC code check in step 22 would label the frame a "bad" frame, and the frame would be replaced in step 23. This is unfortunate since the frame, if synthesized, would have been sufficiently accurate, and most likely more accurate than any estimated frame constructed in step 23. Moreover, the construction of estimated frames in step 23 takes processing time and slows the rate at which data can be transmitted to the second vocoder 7. By reducing the number of erroneous frames detected, the data flow rate can be increased.

A second drawback is that the master CRC master coding formula is relatively less robust because it incorporates every bit position which could possibly include an important bit "B" under the various modes. The robustness of a CRC coding formula, i.e. its ability to detect an error in the data for which it is protecting, is directly related to the number of bits in the CRC code and the number of bits that go into the CRC coding formula which produces the CRC code. Therefore, if it is possible to reduce the number of bits being protected, i.e. being used in the CRC coding formula, the robustness of the CRC code will be improved.

SUMMARY OF THE INVENTION

One object of the present invention is to provide a method of detecting errors in data received by a multi-mode vocoder, with the method including the steps of: receiving a transmission including data and an error code; reading the error code; and successively comparing the error code to portions of the data using a plurality of formula, until at least one the comparisons matches, meaning the data is error-free, or all of the comparisons fail, meaning the data is erroneous.

Another object of the present invention is to provide a method of detecting errors in data received by a multi-mode vocoder, with the method including the steps of: reading portions of the data identifying a mode and an error code; and comparing the error code to portions of the data using a formula dictated by the mode, wherein if the comparison matches the data is deemed error-free and otherwise the data is deemed erroneous.

Yet another object of the present invention is to provide a method of forming data for transmission by a multi-mode vocoder, with the method including the steps of: analyzing an input signal of the multi-mode vocoder to determine a mode of the multi-mode vocoder; processing the input signal, in accordance with the mode, to form data; forming an error code by applying a formula to a portion of the data, with the formula being selected in accordance with the mode; and attaching the error code to the data.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 is a table illustrating two sequential frames transmitted from the first vocoder of FIG. 1;

FIG. 4 is a table illustrating the important bits of four different modes of the first vocoder of FIG. 1;

FIG. 8 is a block diagram illustrating component parts of an alternative embodiment of the second multi-mode vocoders, in accordance with the present invention; and FIG. 9 is a flow chart illustrating an alternative method of operation for the second vocoder of FIG. 8.

DETAILED DESCRIPTION OF THE INVENTION

Figure 1:
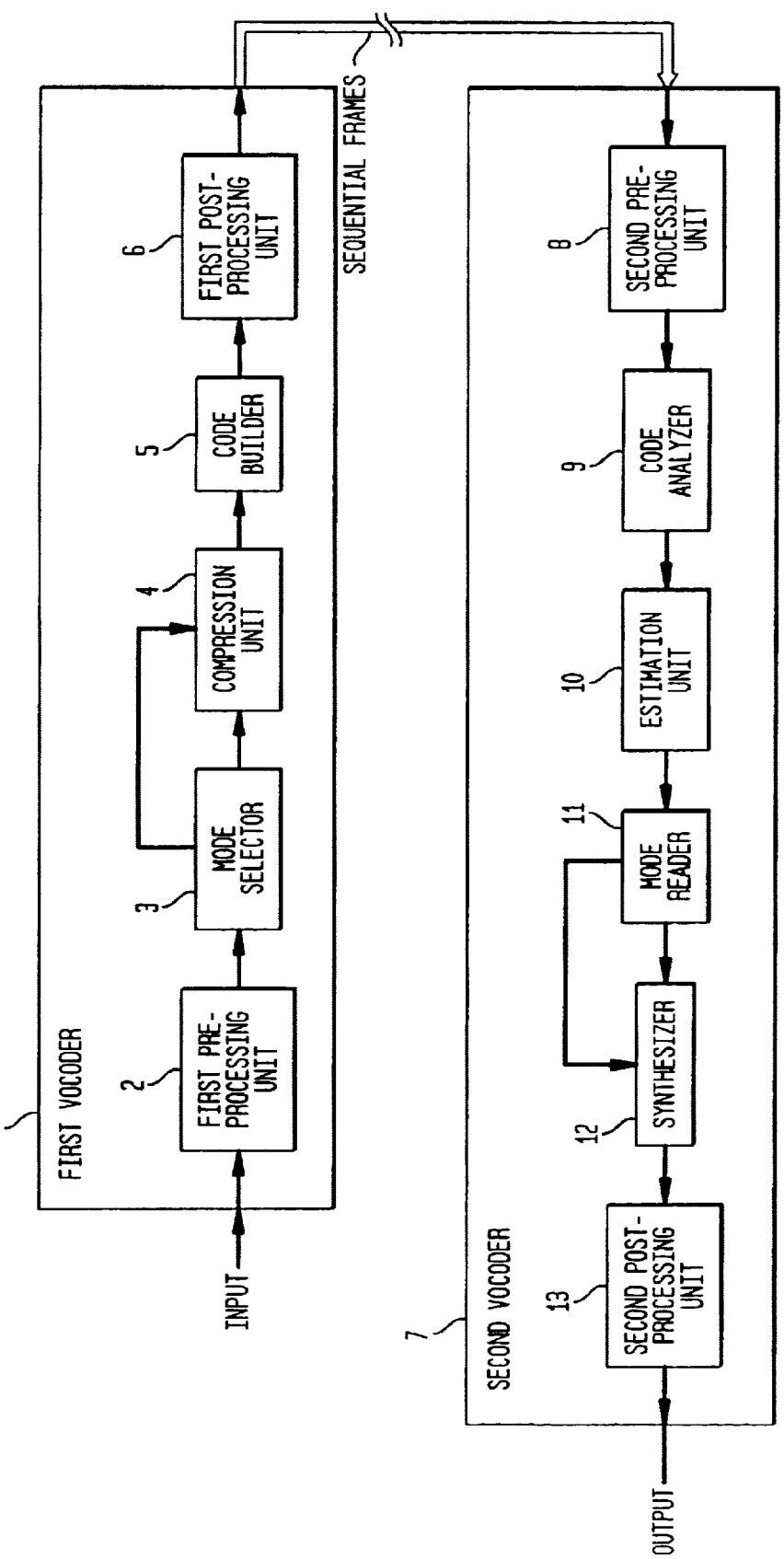
FIG. 1 is a block diagram illustrating component parts of first and second multi-mode vocoders, in accordance with the background art.
Figure 2:
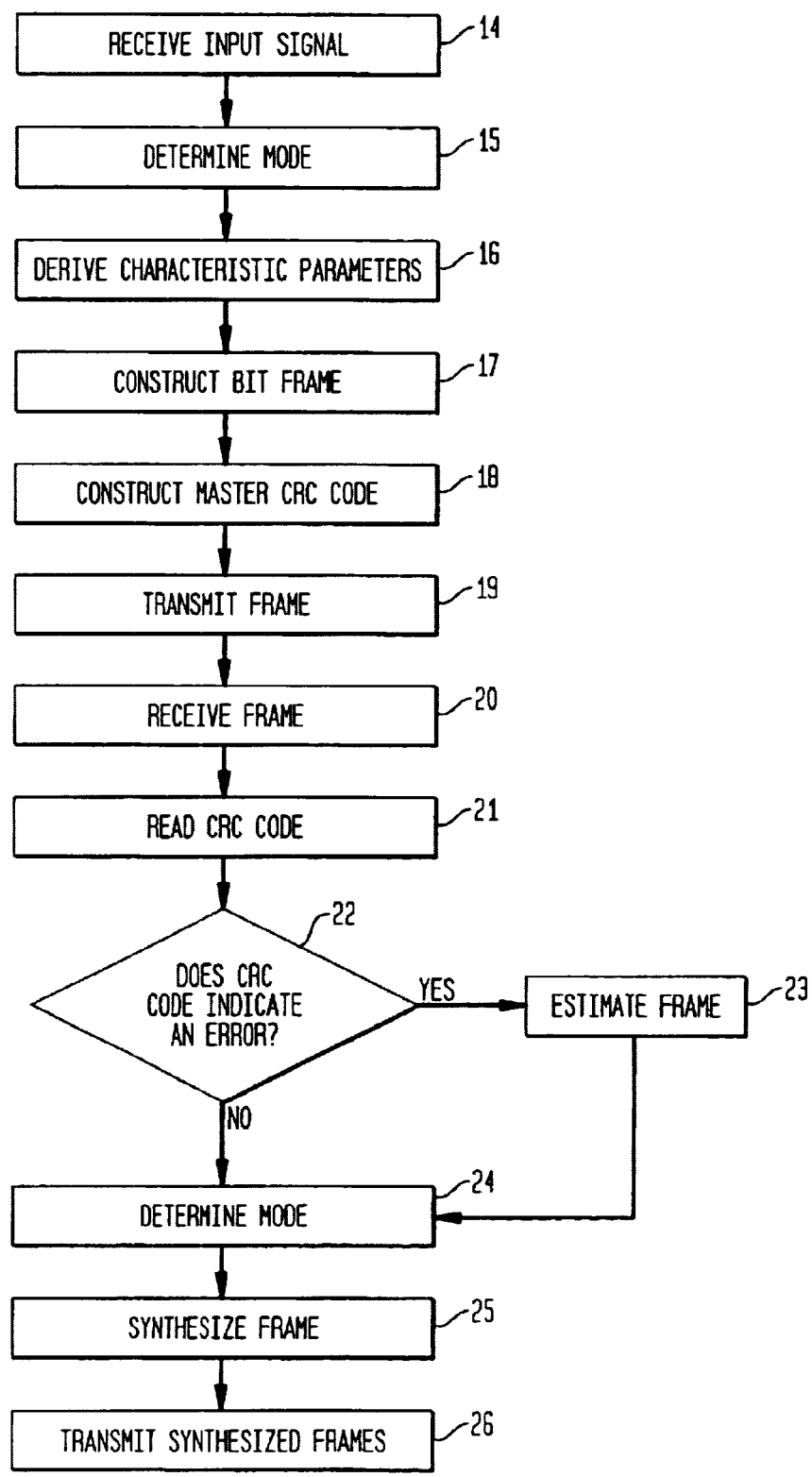
FIG. 2 is a flow chart illustrating a method of operation of the first and second vocoders of FIG. 1.
Figure 5:
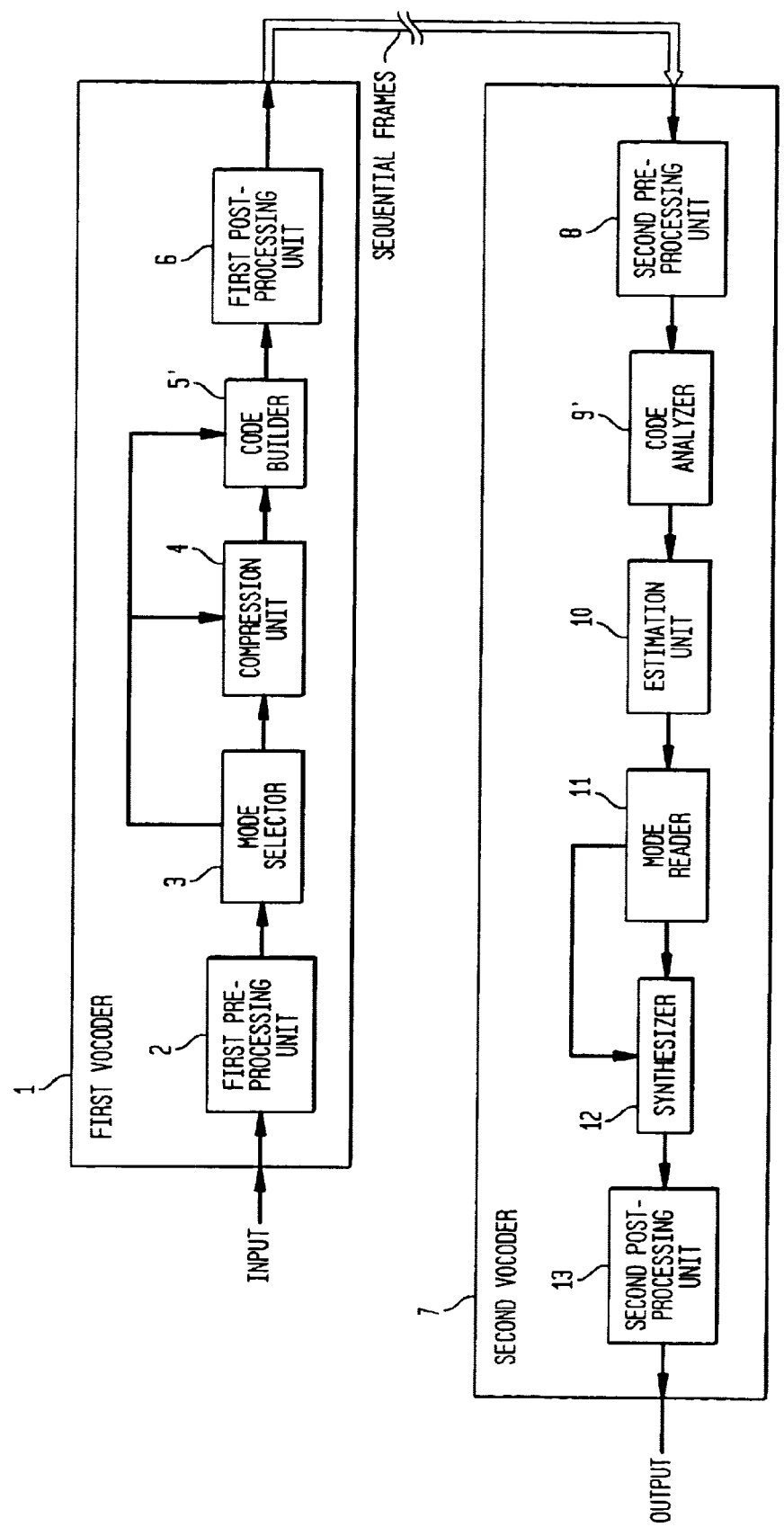
FIG. 5 is a block diagram illustrating component parts of first and second multi-mode vocoders, in accordance with the present invention.

FIG. 5 illustrates first and second vocoders in accordance with the present invention. Same reference numerals have been assigned to same or analogous elements as illustrated in FIG. 1. The first vocoder 1 and the second vocoder 7 include the same structures as illustrated in FIG. 1 except that, it is important to note that in the first vocoder 1, the code builder 5' receives the mode from the mode selector 3.

Figure 6:
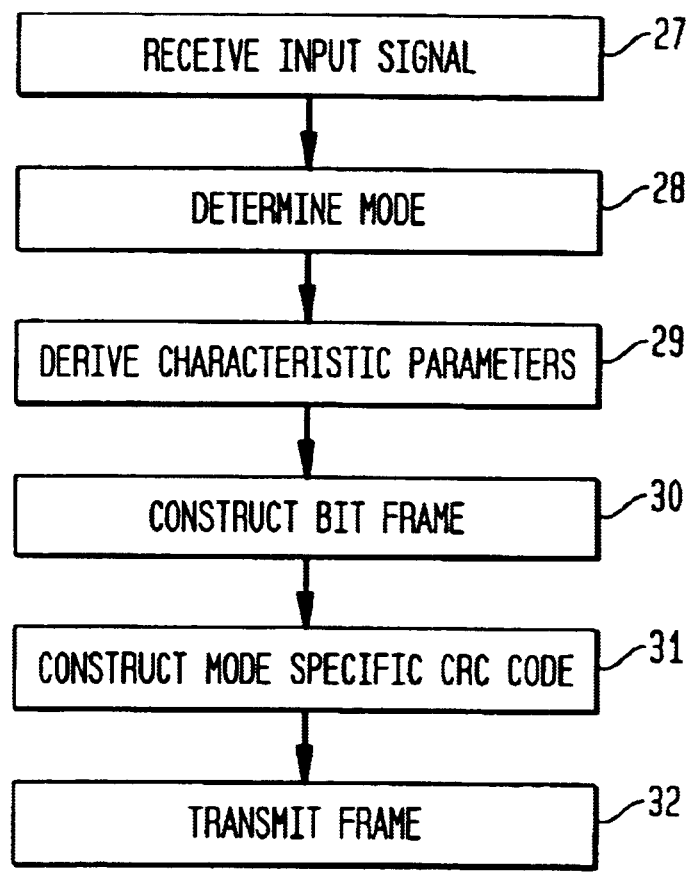
FIG. 6 is a flow chart illustrating a method of operation of the first vocoder of FIG. 5.

FIG. 6 is a flow chart illustrating a method of operation for the first vocoder 1. Steps 27 through 30 and 32 correspond to steps 14 through 17 and 19, discussed in relation to the background art above. Step 31 departures from the background art. In step 31, a mode specific CRC code is constructed by focusing on the important bits in the frame for the particular mode. In other words, each mode would have its own CRC coding formula.

Figures 3, 4:
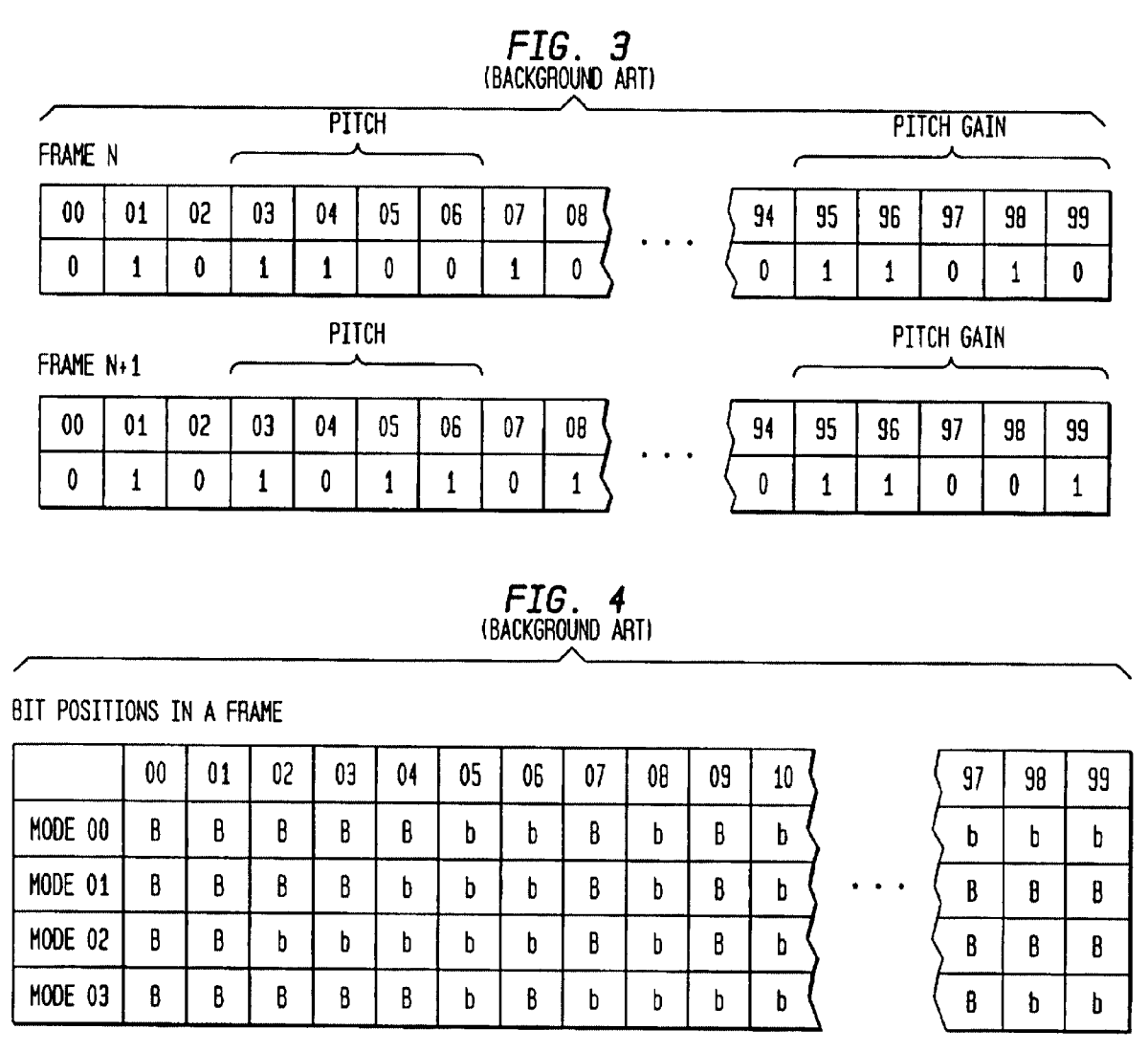

For instance with reference to FIG. 4, the CRC coding formula for mode 00 could be a complex polynomial involving only bits 00, 01, 02, 03, 04, 07, and 09 (of the illustrated bits for mode 00). The CRC coding formula for mode 01 would be a complex polynomial involving only bits 00, 01, 02, 03, 07, 09, 97, 98 and 99 (of the illustrated bits for mode 01). The mode specific CRC coding formula is not a master CRC coding formula. Rather, the CRC coding formula for each mode can be tailored to protect only, or mostly, the important bits for the respective mode. Since fewer bits are used in the construction of each mode specific CRC code, each mode specific CRC code will have a higher integrity, or be more robust, than a master CRC code.

Figure 7:
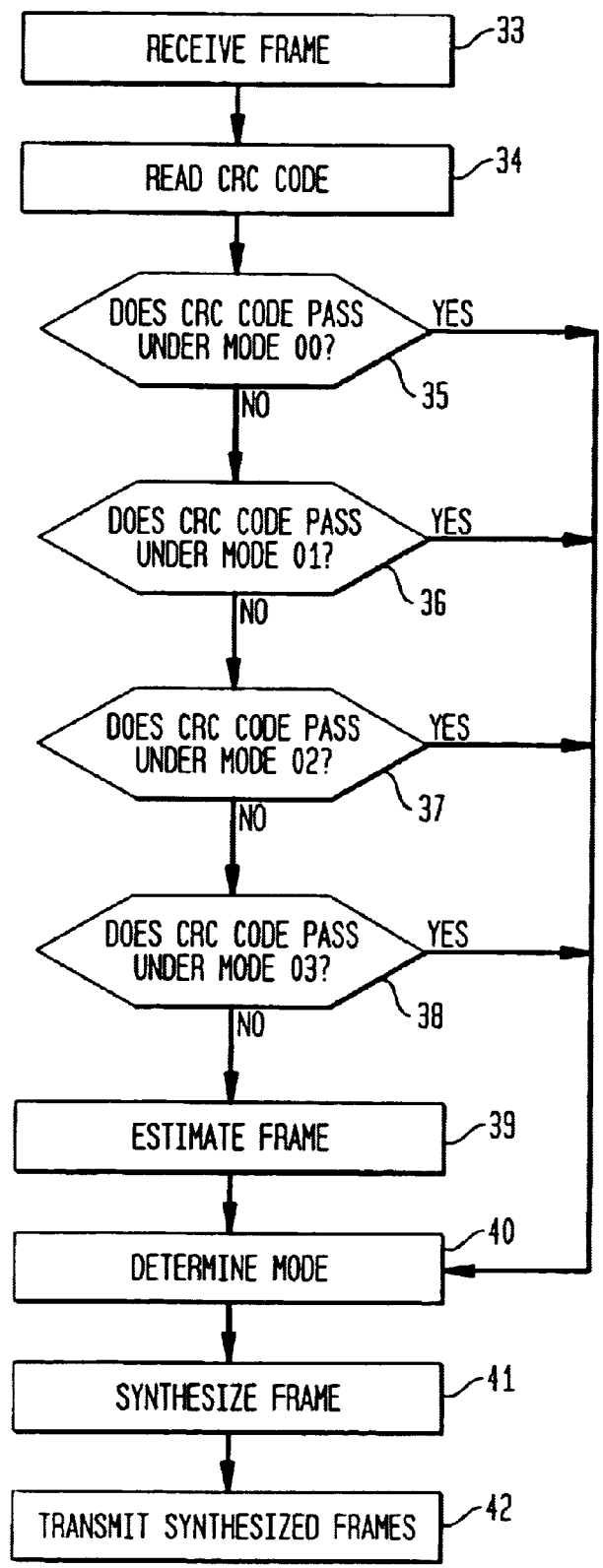
FIG. 7 is a flow chart illustrating a method of operation of the second vocoder of FIG. 5.

FIG. 7 is a flow chart illustrating an embodiment of a method of operation for the second vocoder 7 of FIG. 5. In step 33, the frame is received by the second preprocessing unit 8, and in step 34, the code analyzer 9' reads the CRC code. Steps 33 and 34 are analogous to steps 20 and 21 of the background art.

The code analyzer 9' has been preprogrammed with the coding formulas for each of the possible modes of the code builder 5'. In step 35, the code analyzer 9' compares the CRC code to the other bits within the frame to determine if the frame would be a "good" frame, i.e. an error-free frame, using the coding formula for mode 00. If the frame is "good," the operation goes to step 40, otherwise the process continues to step 36. In step 36, the code analyzer 9' compares the CRC code to the bits within the frame to determine is if the frame would be a "good" frame using the coding formula for mode 01. If the frame is "good," the operation goes to step 40, otherwise the process continues to step 37. In step 37, the code analyzer 9' analyzes the CRC code using the coding formula for mode 02. If the frame is "good," the operation goes to step 40, otherwise the process continues to step 38. In step 38, the code analyzer 9' analyzes the CRC code using the coding formula for mode 03. If the frame is "good," the operation goes to step 40, otherwise the frame is labeled a "bad" frame, i.e. an erroneous frame, and the operation proceeds to step 39. Thus, the CRC code is sequentially analyzed under each mode's coding scheme until either (1) one of the mode's coding schemes is satisfied, or (2) all of the mode's coding schemes have failed. It should be noted that this technique would be applicable to more or less than four modes.

In step 39, the "bad" frame is replaced by an estimated frame constructed by the estimation unit 10. The estimation unit 10 estimates the mode of the "bad" frame, and then estimates each characterizing parameter within the frame for the estimated mode. The process then proceeds to step 40. In step 40, the frame, albeit a "good" frame or an estimated frame, has its mode, either actual or estimated, respectively, determined by the mode reader 11. Next, in step 41, the synthesizer 12 synthesizes the frame. Of course, the estimation unit 10 could send the estimated mode directly to the synthesizer 12, instead of encoding the estimated mode into the frame. Lastly, in step 42, the second post-processing unit 13 outputs the synthesized frame.

FIG. 8 illustrates an alternative embodiment for the second vocoder 7. The second vocoder 7 includes the same components as illustrated in FIGS. 1 and 5. However, it is important to note that the mode reader 11' is placed before the code analyzer 9" in the processing flow and that the code analyzer 9" receives the mode.

FIG. 9 is a flow chart illustrating a second method of operation for the second vocoder 7. In step 43, the frame is received by the second pre-processing unit 8, in an analogous manner to step 20 of the background art.

The frame will contain bits indicating the mode of the frame. The mode bits could be the first positions of the frame, as illustrated in FIG. 4, or in any other position in the frame. In step 44, the mode of the frame is read by the mode reader 11', by intercepting the mode bits. The mode is sent to the code analyzer 9" and the synthesizer 12.

In step 45, the code analyzer 9 need only determine if the CRC code corresponds to the important bits within the frame, after the mode specific formula has been applied to those bits. If so, the frame is labeled "good" and processing proceeds to step 47 and the frame is synthesized in accordance with the mode detected in step 44. If not, the frame is labeled "bad" and processing proceeds to step 46. In step 46, an estimated frame including a new estimated mode is constructed and processing proceeds to step 47 and the estimated frame is synthesized in accordance with the estimated mode. Lastly, in step 48, the synthesized frame is transmitted by the second post-processing unit 13, in a manner consistent with steps 26 and 42 discussed above.

In methods of operating the second vocoder 7 illustrated in FIGS. 5 and 7–9, it would be possible to remove the mode reader 11 from the second vocoder 7, and to determine the mode of the frame by determining which one of mode's CRC coding formulas is satisfied by the CRC code. Under this circumstance, the mode, as determined by the code analyzer 9, would be sent to the synthesizer 12.

In the methods of FIGS. 7 and 9, it can be seen that a more robust CRC coding formula is attainable for each mode of operation as compared to the robustness of a master CRC coding formula. Further, it can be seen that frames will judged a "bad" less frequently, because unimportant bits are either non-existent in the mode specific CRC coding formula, or at least not as prevalent as compared to a master CRC coding formula. Although the present invention has been described using CRC coding, it should be noted that the other types of error checking code formats would equally apply, and could be substituted for the CRC code format.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For instance, it would be possible to have a frame length which varies in between modes. In such a circumstance, the frames would include start bit and/or stop bit sequences. Also, the present invention would be equally applicable to encoding data prior to storage, and ensuring the accuracy of the data once retrieved by the same encoding/decoding vocoder.

We claim:

1. A method of detecting errors in data received by a multi-mode vocoder, said method comprising:

receiving a transmission, the transmission including data and an error code;

reading the error code; and determining whether the data is erroneous by successively comparing the error code to portions of the data using a plurality of formulas until at least one of the comparisons matches, or all of the comparisons fail, the data being determined error-free if one of the comparisons matches, the data being determined erroneous if all of the comparisons fail.

2. The method according to claim 1, wherein the transmission is a frame of bits and the error code is a plurality of bits within the frame.

3. The method according to claim 2, wherein said comparing step includes applying one of the plurality of formulas to certain bits within the frame.

4. The method according to claim 3, wherein the data is representative of a speech signal, and the certain bits within the frame are representative of important characterizing parameters of the speech signal.

5. The method according to claim 3, wherein said comparing step includes applying a first formula to first certain bits within the frame, and applying a second formula to second certain bits within the frame, wherein the first certain bits are in different locations within the frame relative to the second certain bits.

6. The method according to claim 3, wherein said comparing step includes applying a first formula to first certain bits within the frame, and applying a second formula to second certain bits within the frame, wherein a number of the first certain bits is different from a number of the second certain bits.

7. The method according to claim 1, wherein each formula of the plurality of formulas is uniquely associated with a different mode of various modes of the multi-mode vocoder, the various modes of the vocoder being determined by types of data being received by the multi-mode vocoder.

8. The method according to claim 7, wherein the types of data include voiced speech signals and unvoiced speech signals.

9. A method of detecting errors in a data transmission received by a multi-mode vocoder, the data transmission including data and an error code, said method comprising:

reading the error code and portions of the data identifyg a mode; and determining whether the data is erroneous by comparing the error code to portions of the data using a formula dictated by the identified mode, wherein if the comparison matches, the data is deemed error-free and otherwise the data is deemed erroneous, wherein the multi-mode vocoder has a plurality of modes and a plurality of formulas, the identified mode being the one of the plurality of modes corresponding to a type of the data, and each formula being uniquely associated with a respective one of the plurality of modes.

10. The method according to claim 9, wherein the data is a frame of bits, the error code is a plurality of error code bits within the frame, and the mode is a plurality of mode bits within the frame.

11. The method according to claim 10, wherein said comparing step includes applying the formula, dictated by the mode, to certain bits within the frame and the mode bits.

12. The method according to claim 11, wherein the data is representative of a speech signal, and the certain bits within the frame are representative of important characterizing parameters of the speech signal.

13. The method according to claim 9, wherein the type of data is one of voiced speech signals and unvoiced speech signals.

14. A method of forming data for transmission by a multi-mode vocoder, said method comprising:

analyzing an input signal of the multi-mode vocoder to determine a mode of the multi-mode vocoder;

processing the input signal, in accordance with the mode, to form data;

selecting a formula from a plurality of formulas based on the mode;

forming an error code by applying the selected formula to a portion of the data, with the formula being selected in accordance with the mode; and attaching the error code to the data, wherein the multi-mode vocoder has a plurality of modes, each mode being determinative of types of data being transmitted by the multi-mode vocoder, and each of the plurality of formulas being uniquely associated with a respective one of the plurality of modes.

15. The method according to claim 14, wherein the data is a frame of bits and the error code is a plurality of bits within the frame.

16. The method according to claim 15, wherein the data is representative of a speech signal, and the formula, selected in accordance with the mode, is applied to certain bits within the frame which are representative of important characterizing parameters of the speech signal.

17. The method according to claim 14, wherein the types of data include voiced speech signals and unvoiced speech signals.

18. A multi-mode vocoder comprising:

receiving means for receiving a transmission, the transmission including data and an error code;

code analyzing means for determining whether the data is erroneous by successively comparing the error code to portions of the data using a plurality of formulas, until at least one of the comparisons matches or all of the comparisons fail, the data being determined error-free if one of the comparisons matches, the data being determined erroneous if all the comparisons fail; and estimation means for replacing the speech data with estimated data if all of the comparisons fail.

19. The multi-mode vocoder of claim 18, wherein the transmission is a frame of bits and the error code is a plurality of bits within the frame.

20. The multi-mode vocoder according to claim 19, wherein said code analyzing means applies one of the plurality of formulas to certain bits within the frame.

21. The multi-mode vocoder according to claim 20, wherein the data is representative of a speech signal, and the certain bits within the frame are representative of important characterizing parameters of the speech signal.

22. The multi-mode vocoder according to claim 20, wherein said code analyzing means a first formula to first certain bits within the frame, and applies a second formula to second certain bits within the frame, wherein the first certain bits are in different locations within the frame relative to the second certain bits.

23. The multi-vocoder according to claim 20, wherein said code analyzing means applies a first formula to first certain bits within the frame, and applies a second formula to second certain bits within the frame, wherein a number of the first certain bits is different from a number of the second certain bits.

24. The multi-mode vocoder according to claim 18, wherein each formula of the plurality of formulas is uniquely associated with a different mode of various modes, the various modes being determined by types of data being received by the receiving means.

25. The multi-mode vocoder according to claim 24, wherein the types of data include voiced speech signals and unvoiced speech signals.

26. A multi-mode vocoder comprising:
   receiving means for receiving a transmission, the transmission including data and an error code;
   mode reading means for reading portions of the data identifying a mode;
   code analyzing means for determining whether the data is erroneous by comparing the error code to portions of the data using a formulas determined from a plurality of formulas by the identified mode, wherein the data is determined error-free if the comparison matches and the data is determined erroneous if the comparison fails; and
   estimation means for replacing the speech data with estimated data if the data is determined erroneous.

27. The multi-mode vocoder according to claim 26, wherein the data is a frame of bits, the error code is a plurality of error code bits within the frame, and the mode is a plurality of mode bits within the frame.

28. The multi-mode vocoder according to claim 27, wherein said code analyzing means includes applying the formula, determined based on the mode, to certain bits within the frame and the mode bits.

29. The multi-mode vocoder according to claim 28, wherein the data is representative of a speech signal, and the certain bits within the frame are representative of important characterizing parameters of the speech signal.

30. The multi-mode vocoder according to claim 26, wherein the identified mode is representative of a type of data being received by the receiving means, and each formula of the plurality of formulas being uniquely associated with a mode.

31. The multi-mode vocoder according to claim 30, wherein the types of data include voiced speech signals and unvoiced speech signals.

32. A multi-mode vocoder comprising:
   mode selecting means for analyzing an input signal to determine a mode;
   processing means for processing the input signal, in accordance with the determined mode, to form data;
   code building means for selecting a formula from a plurality of formulas based on the determined mode and forming an error code by applying the selected formula to a portion of the data, the error code being attached to the data
   transmitting means for transmitting the data with the attached error code.

33. The multi-mode vocoder according to claim 32, wherein the data is a frame of bits and the error code is a plurality of bits within the frame.

34. The multi-mode vocoder according to claim 32, wherein the data is representative of a speech signal, and the formula, selected based on the determined mode, is applied to certain bits within the frame which are representative of important characterizing parameters of the speech signal.

35. The multi-mode vocoder according to claim 32, wherein the determined mode is determinative of a type of data being transmitted, and each formula being uniquely associated with a respective one of the plurality of modes.

36. The multi-mode vocoder according to claim 35, wherein the types of data include voiced speech signals and unvoiced speech signals.

* * * * *